Aug. 4, 1959 H. T. HUNTER 2,897,772
METHOD AND APPARATUS FOR THE PRODUCTION OF COMESTIBLES
Filed Sept. 30, 1955 6 Sheets-Sheet 2
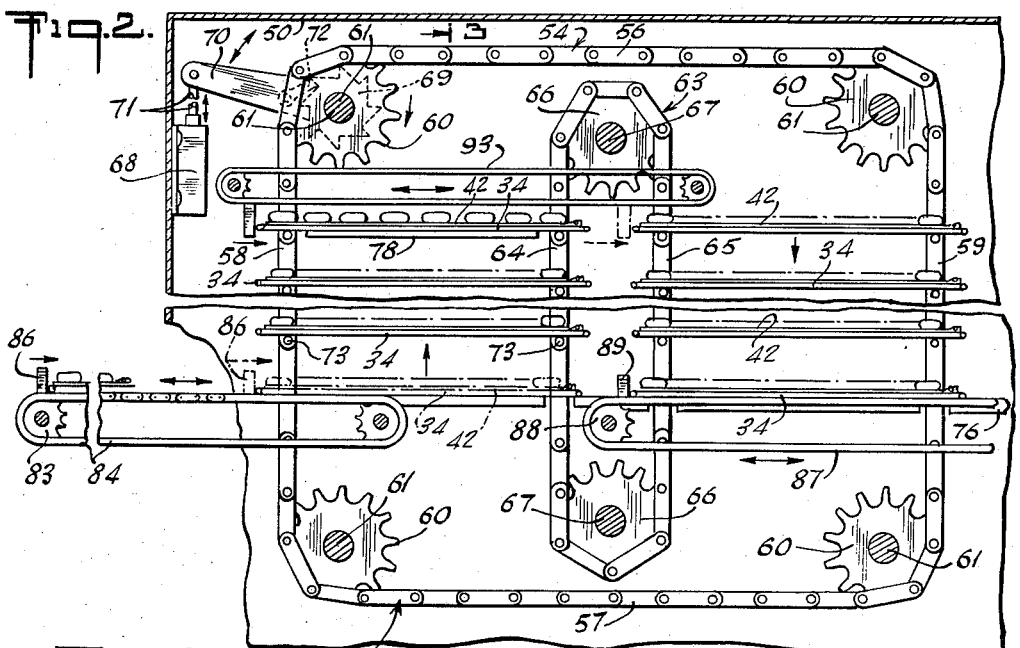
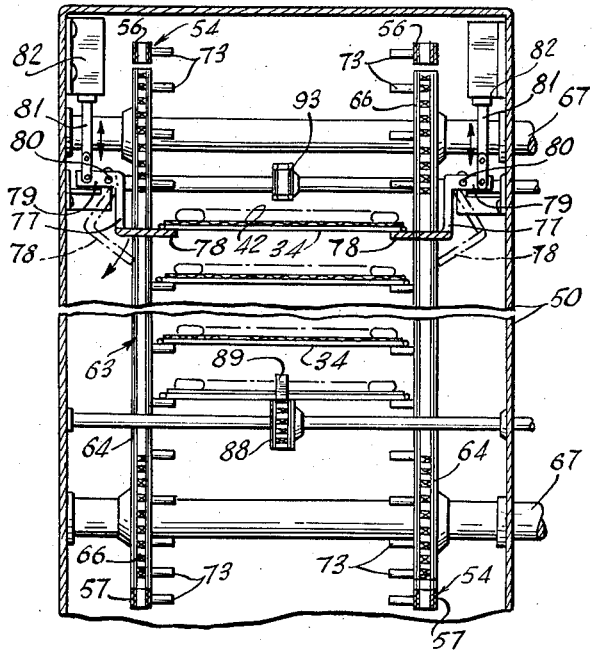
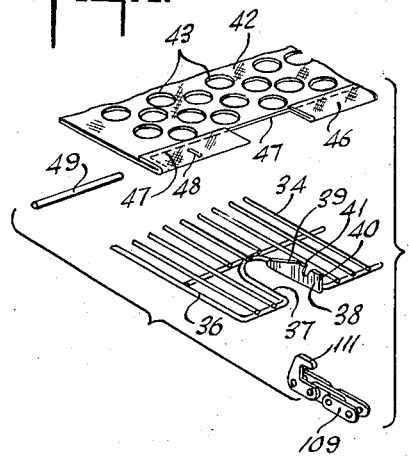
INVENTOR
HERBERT T. HUNTER
BY
William R. Lieberman
ATTORNEY

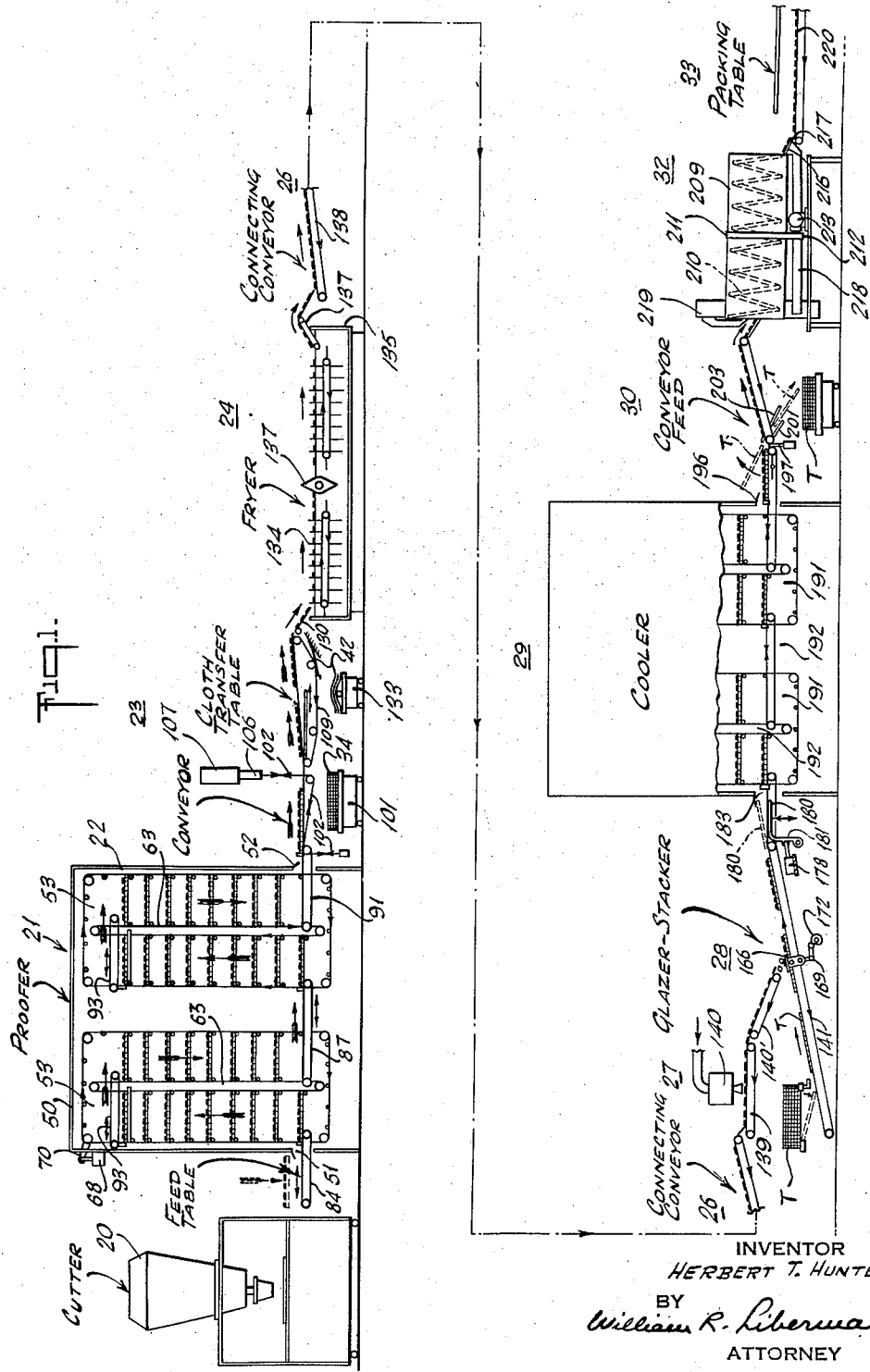

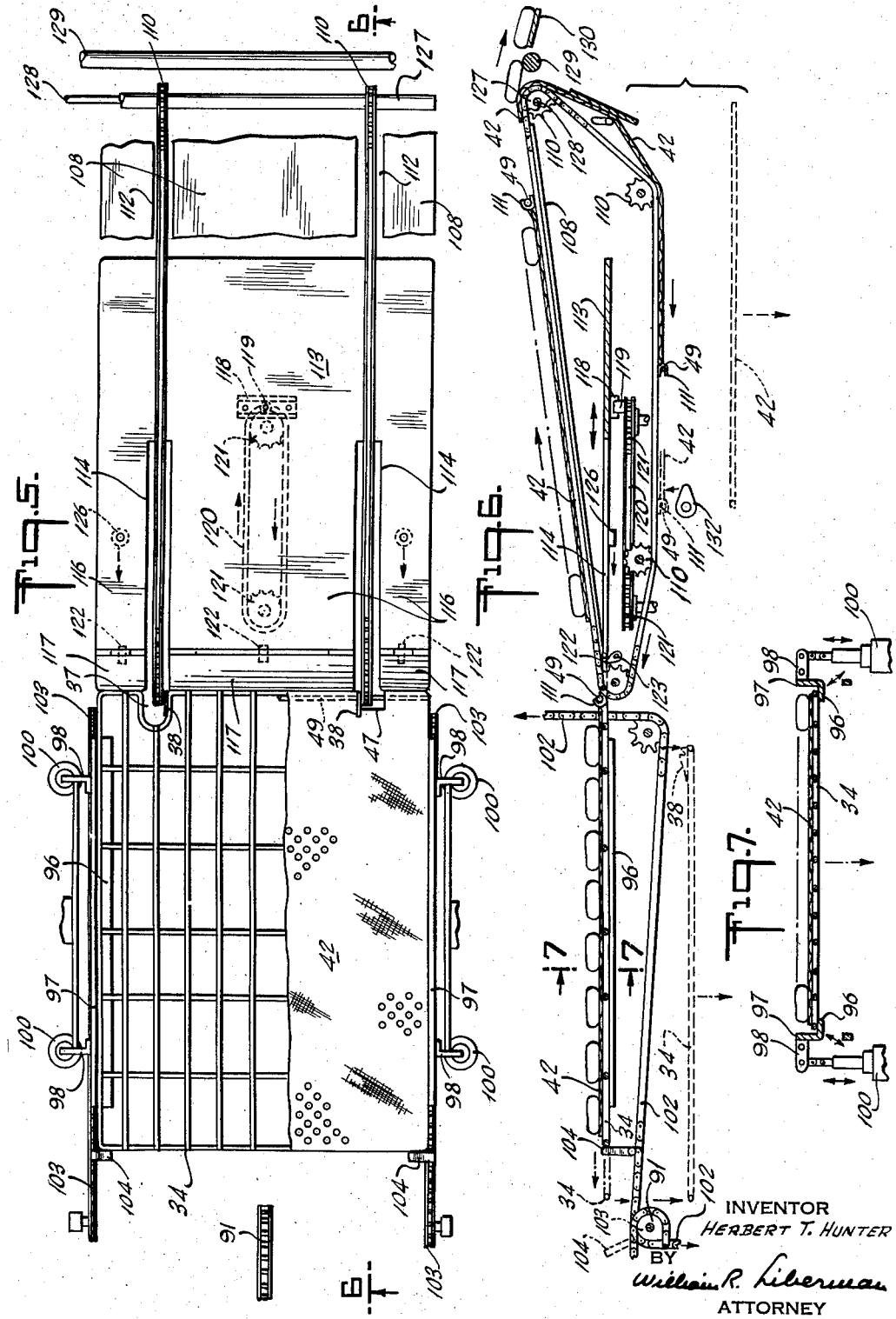

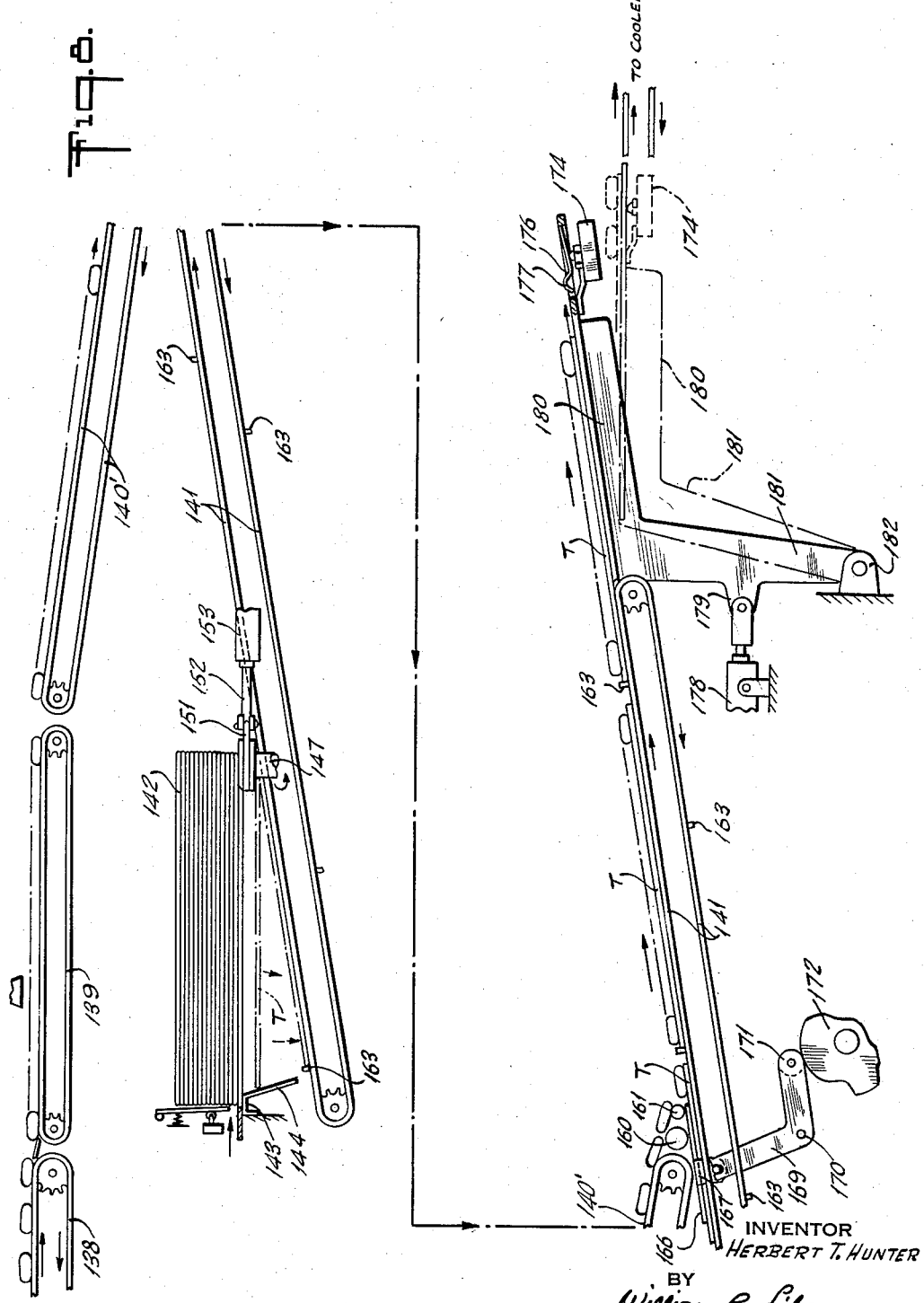

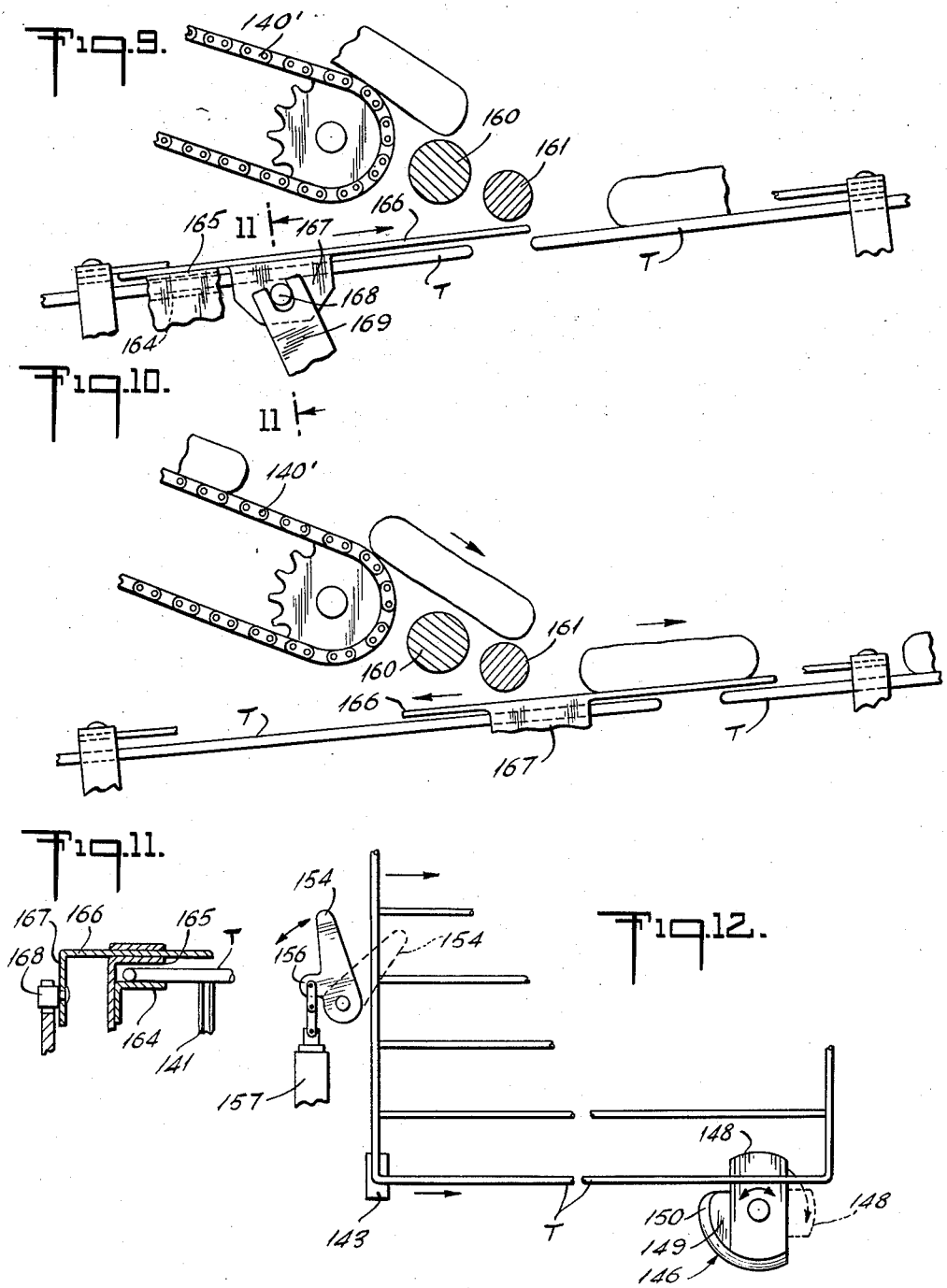

Aug. 4, 1959 H. T. HUNTER 2,897,772
METHOD AND APPARATUS FOR THE PRODUCTION OF COMESTIBLES
Filed Sept. 30, 1955 6 Sheets-Sheet 6
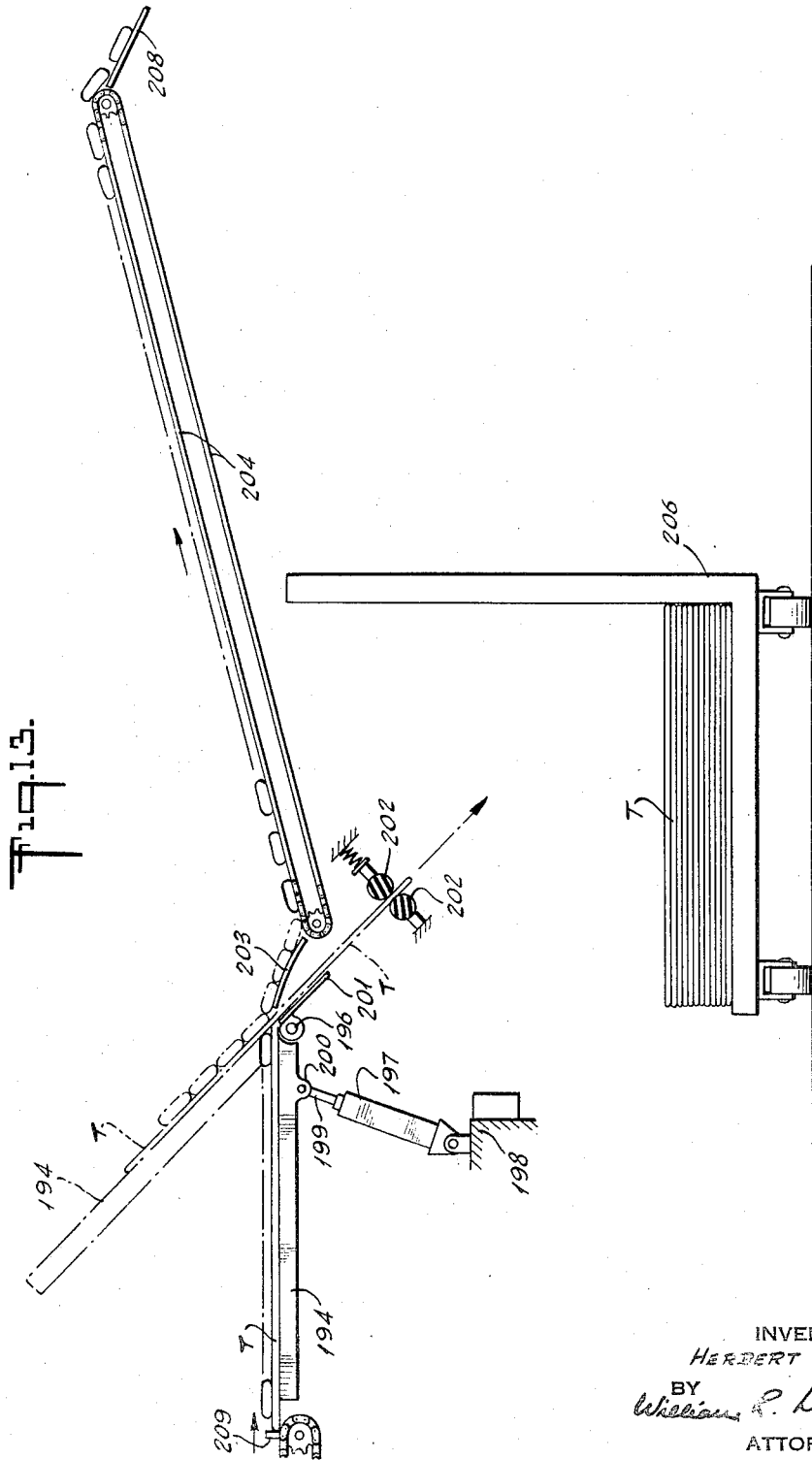
INVENTOR
HERBERT T. HUNTER
BY
William P. Lieberman
ATTORNEY United States Patent Office 2,897,772
Patented Aug. 4, 1959

2,897,772

METHOD AND APPARATUS FOR THE PRODUCTION OF COMESTIBLES

Herbert T. Hunter, Catonsville, Md., assignor to DCA Food Industries Inc., New York, N.Y., a corporation of New York Application September 30, 1955, Serial No. 537,763

8 Claims. (Cl. 107—54)

The present invention relates to an improved method and apparatus for the production of comestibles, and it relates more particularly to an improved method and apparatus for the production of fried cakes, such as doughnuts, crullers, and the like, which may be plain or sugared, glazed or otherwise coated.

In accordance with the conventional method of producing yeast-raised doughnuts and the like, the unraised dough is cut into pieces corresponding to the individual cakes, which are then loaded upon trays. The trays are stored in a conditioning or proofing compartment, which may be a room or a chamber maintained under closely controlled temperature and moisture conditions. After the pieces of dough have reached the desired raised state, they are removed from the trays and deposited in a deep frying unit where the dough is cooked. The cooked cakes are thereafter removed from the frying unit, allowed to cool for a short period of time and then glazed and cooled under controlled humidity and temperature conditions. In the alternative, the cakes may be cooled as aforesaid and then sugared, whereafter the finished cakes are packaged. The various units employed in the production of the fried cakes are generally independent of each other and they must be individually fed and the output individually removed.

It is thus apparent that the conventional process and the conventional equipment for the production of fried cakes and the like require considerable personal attendance and manipulation, and are highly inefficient in the employment of labor, power and space. Furthermore, the uniformity and quality of the product often leaves much to be desired. The space requirements for the equipment are large and the transport devices numerous and cumbersome.

It is thus the principal object of the present invention to provide an improved method for the production of comestibles.

Another object of the present invention is to provide an improved apparatus for the production of comestibles.

Still another object of the present invention is to provide an improved method and apparatus for the production of baked articles, such as fried cakes and the like.

A further object of the present invention is to provide an improved method and apparatus for the continuous production of baked products, such as fried cakes and the like.

Still a further object of the present invention is to provide a continuous method and apparatus for the production of yeast-raised baked articles from the formation of the unraised pieces of dough to the finished product ready for packaging.

Another object of the present invention is to provide an improved device for the continuous proofing or conditioning of pieces of dough, said device being characterized by its compactness, high capacity, efficiency and versatility.

Still another object of the present invention is to provide an improved method and apparatus for the continuous proofing or conditioning of yeast-raised dough characterized by its ability to control the surface properties of the dough pieces and to closely control the amount of raising of the dough.

A further object of the present invention is to provide an improved support for a plurality of cut pieces of dough to enhance the dough raising conditions.

Still a further object of the present invention is to provide an improved device for separating the raised pieces of dough from the supports thereof.

Another object of the present invention is to provide an improved apparatus for depositing articles upon successively advanced trays in which the articles are prevented from falling between successive trays or upon the spaces separating the successive trays.

A further object of the present invention is to provide an improved method and apparatus for the cooling of baked products, said apparatus having a novel temperature and humidity cycle.

Still a further object of the present invention is to provide an improved cooling apparatus characterized by a novel conveyor system and conveyor actuating system.

Another object of the present invention is to provide an improved tray unloading device.

Still another object of the present invention is to provide an improved device for the application of powdered sugar to fried cakes.

The above and other objects of the present invention will become apparent from a reading of the following description taken in conjunction with the accompanying drawings, wherein Figure 1 is a diagrammatic side elevational view, of an improved system for the production of glazed or sugared yeast-raised doughnuts, said system embodying the present invention;

Figure 2 is a vertical detail sectional view, partially broken away, of a portion of the tray conveying and tray shifting mechanism of the proofer and cooler units;

Figure 3 is a sectional view taken along line 3—3 in Figure 2, the tracks 76 not being illustrated;

Figure 4 is a detail exploded perspective view of a leading corner of the tray and proofing cloth and the cloth engaging element;

Figure 5 is a top plan view, partially broken away, of the device for separating the proofer cloth from the tray and removing pieces of dough from the cloth;

Figure 6 is a sectional view taken along line 6—6 in Figure 5;

Figure 7 is a sectional view taken along line 7—7 in Figure 6;

Figure 8 is a partially diagrammatic side elevational view of the improved mechanism for depositing the fried cakes upon successively fed trays;

Figure 9 is an enlarged detail view of the cake transfer mechanism in a bridge retracted position;

Figure 10 is a view similar to Figure 9 with the bridge in an advance position;

Figure 11 is a sectional view taken along line 11—11 in Figure 9;

Figure 12 is a top plan view, partially broken away, illustrating the tray metering mechanism; and Figure 13 is a side elevational detail view of the improved mechanism for unloading the doughnuts from successive trays.

In one of its aspects, the present invention contemplates the provision of a system for the continuous production of baked products, including a plurality of trays, a proofing chamber, means for intermittently transporting said trays through said proofing chamber, means for controlling the ambient temperature and humidity within said proofing chamber, means for separating pieces of dough from said trays discharged from said proofing chamber and delivering said pieces of dough to a cooking unit, means for continuously conveying said pieces of dough through said cooking unit, means for depositing said fried pieces of dough upon successive trays, a cooling chamber, means for introducing said successive trays into said cooling chamber and means for intermittently transporting said cooked pieces of dough through said cooling cabinet.

A feature of the present invention resides in the proofing system which includes a perforated, relatively rigid tray upon which is superimposed a perforated cloth, the leading corresponding ends of said tray and said cloth being removably secured to each other.

Another feature of the present invention is the improved proofing equipment, which includes a temperature and humidity controlled chamber, a pair of transversely spaced endless conveyors having successive longitudinally spaced flights vertically advancing in opposite directions and extending from a feed end to a discharge end, means for intermittently advancing said conveyors predetermined increments separated by a rest period, said cabinet having a tray loading opening adjacent the said feed end of said conveyors and a tray discharge opening adjacent the discharge end of said conveyors, means for advancing a tray through said feed opening into engagement with said conveyor and from said conveyor out of said discharge opening during said rest period, means for advancing during said rest period a tray from said conveyor adjacent the upper and lower termini of its vertical flight to the next successive conveyor.

Still another feature of the present invention is the improved device for separating the proofing cloth from the tray and removing the pieces of dough from the proofing cloth, said device including a slide adapted to engage the side bottom edges of the tray, a flat spatula element, means for advancing said tray along said slide toward said spatula element, means for engaging the leading edge of said cloth and advancing said cloth, means for inserting said spatula element between said cloth and said tray while advancing said cloth, means for retracting said tray, means for discharging said tray from said slide, and means for separating said pieces of dough from said cloth.

A further feature of the present invention is the improved device for loading the fried cakes upon successive trays, which includes means for continuously advancing longitudinally spaced trays in an end-to-end relationship, means for depositing articles upon said trays at a feed point, a bridging member disposed immediately above the path of said trays and directly below said feed point and means for reciprocating said bridging member in synchronism with the advance of said trays, whereby said bridging member overlies the space between successive trays as said space is disposed below said feed point.

Still a further feature of the present invention resides in the improved cooling chamber which is provided with a conveying system similar to that of the proofing chamber, different therefrom principally in that there is provided a tray feeding platform, means for actuating the conveyor in response to a tray being deposited upon said platform, means for advancing said tray onto said conveyor immediately prior to the increment advance of said conveyor, said conveyor being stationary following its advance until actuated by the deposition of another tray upon the loading platform.

Referring now to the drawings, and more particularly to Figure 1 thereof, which illustrates a preferred embodiment of the present invention as applied to the production of yeast-raised doughnuts which may be alternatively glazed or sugared, numeral 20 generally designates a multiple doughnut automatic cutting machine which may be of conventional construction or of the type described in U.S. Patent No. 2,709,974, issued June 7, 1955.

A cloth carrying tray of a structure which will be hereinafter described, is inserted under the discharge opening of the doughnut cutting machine 20 and is loaded with a plurality of pieces of yeast-containing dough of predetermined size and dimension. The cutter 20 may be of the automatic continuous type, in which case it is synchronized with the proofer conveyor.

Following the cutter 20 is a proofer cabinet 21 of such dimensions to permit the adequate raising of the yeast dough in accordance with the capacity of the proofer. Means are provided for circulating air through the proofer and for controlling the humidity and temperature of the air in a manner to be later described.

A tray conveying system 22 is disposed within the proofing cabinet 21 and intermittently transports successive trays from the feed end of the proofer through a predetermined path to the discharge end thereof. Following the proofer, the trays carrying the raised pieces of dough are transported through a cloth transfer device 23, where the cloth carrying the pieces of dough is separated from the trays, the trays being successively dropped into a stacked condition and the pieces of dough being separated from the cloth and the cloth being then deposited in stacked condition. The pieces of dough are continuously dropped into successive compartments of the continuous fryer 24, such as of the type described in U.S. Patent No. 2,709,955, granted June 7, 1955, where the dough is cooked, then discharged on to a continuous conveyor 26 which carries the cooked cakes into registry with the glazing device 27, from whence the cakes are continuously transported to a tray loader 28 where the cooked cakes are loaded upon successive trays continuously advanced in end-to-end fashion. The trays are then fed to a cooler 29 having an intermittently advancing tray transport mechanism similar to that contained in the proofer 21 but triggered by the delivery of a cake loaded tray to a cooler loading platform. Means are likewise provided in the cooler for circulating air at controlled temperatures and humidities.

Following the discharge from the cooler, there is provided a tray unloading device 30 which removes the cooled cakes from the trays discharged from the cooler 29, depositing the cakes on an endless conveyor and stacking the trays on a suitable truck. The conveyor carries the cooked cakes through a sugar applying device 32, from whence they are discharged upon a packaging conveyor 33. It should be noted that the system illustrated in Figure 1 can be employed in sections and for different applications. When glazed doughnuts are produced, the sugaring device 32 is dispensed with, as is the tray unloading device 30, the cake carrying trays being transported directly to a packing table. On the other hand, when it is desired to make sugared doughnuts, the glazer may be omitted and if the doughnuts are not yeast raised, the cut pieces of dough may be deposited directly into the fryer 24.

The supports for carrying the cut pieces of dough through the proofing chamber are best seen in Figures 4 and 5 of the drawings, and each includes a reticulated tray 34 defined by a rectangular stiff wire grid having an outer frame 36 which is provided along its leading edge with a pair of laterally spaced, U-shaped, rearwardly directed recesses 37. Along the inner edges of each of the recesses 37 is secured an upwardly directed bracket 38 having a rear, downwardly inclined upper edge 39 and a leading edge 40 extending vertically from the leading edge of the tray 34. The bracket 38 has formed therein a downwardly, rearwardly inclined recess 41.

Superimposed upon each of the trays 34 is a rectangular proofing cloth 42 of substantially the same dimensions as the tray 34 and formed preferably of a shrink-proof material, such as a highly preshrunk cotton denim. The cloth 42 is provided with regularly spaced circular openings 43, the edges of which are suitably reinforced by stitching. The leading end of the proofing cloth 42 is folded back on itself and sewn by a line of stitching 44 to provide a laterally extending, tubular member 46 cut away at laterally spaced areas 47 corresponding to the spacing between the brackets 38. Adjacent each end of the tubular members 46, there is formed a reinforced opening 48 through which is inserted a rod 49 which extends substantially for the length of the tubular member 46 and is exposed at the spaces 47. In assembled condition, the spaces 47 register with the brackets 38, and the portions of the rod 49 located in the spaces 47 engage the bracket recesses 41 so that the transportation of the tray 34 in a forward direction insures the carrying of the proofing cloth 42 therewith.

The proofing chamber 21 includes an upright, longitudinally extending, suitably constructed cabinet 50 having transversely extending feed and discharge openings 51 and 52 respectively formed in the end walls of the cabinet 50, preferably at approximately waist level. A tray-carrying platform (not shown) is located in alignment with the feed opening 51. Any conventional blower and control system circulates the air through the cabinet 50 and adjustably regulates the temperature and humidity thereof. The temperature and humidity within the proofing chamber may be regulated by the controlled injection of a water spray and the application of heat in response to the temperature and humidity conditions therein in any manner well known in the air conditioning field.

The tray-conveying system 22 is illustrated as including a pair of longitudinally spaced, vertical conveying sections 53, each of which sections includes successive longitudinally spaced, vertical, upwardly advancing and downwardly advancing runs.

Each of the conveying sections 53, as best seen in Figures 2 and 3 of the drawings, includes a first pair of laterally spaced, endless sprocket chains 54, each having an upper horizontal flight 56 located just below the top wall of the cabinet 50, a lower horizontal flight 57 located a short distance above the floor of the cabinet 50, a trailing, vertical flight 58 and a leading, vertical flight 59. In the case of the first conveyor section 53, the vertical flight 58 is closely adjacent to the trailing end wall of the cabinet 50, and in the case of the second conveying section, the vertical flight 59 is adjacent the leading end wall of the cabinet 50.

Each of the sprocket chains 54 is carried by a plurality of sprocket wheels 60 located at the corners of the sprocket chains 54, the sprocket wheels being rotatably carried on laterally extending shafts 61 so as to rotate in unison. A second pair of laterally spaced endless sprocket chains 63 is disposed within the area of the sprocket chains 54 and includes spaced, vertical runs 64 and 65 respectively. The sprocket chains 63 are carried by sprocket wheels 66 mounted on shafts 67. The sprocket chains 54 and 63 are intermittently advanced in a clockwise direction, as seen in Figure 2 of the drawings, by means of an air cylinder 68 which is actuated by a suitable timing mechanism to reciprocate periodically. A ratchet 69 is mounted on the shaft 61 and is rotatable with the corresponding sprocket wheel 60. A lever 70 is rotatably carried by the shaft 61 and has its free end coupled to the piston rod 71 of the air cylinder 68. Mounted on the lever 70 is a suitable pawl 72 which engages the ratchet 69.

Thus, upon reciprocation of the piston rod 71, the ratchet 69 and sprocket wheel 60 are rotated a corresponding increment accordingly advancing the sprocket chain 54. Furthermore, the sprocket wheel 66 is likewise advanced an increment by means of a suitable direct coupling means between the shaft 67, to which the sprocket 66 is keyed, and the shaft 61, whereby said shafts rotate at the same speed such as by means of additional sprocket wheels keyed to the shafts 61 and 67 and connected by a sprocket chain in the conventional manner. Located on each of the sprocket chains 54 and 63 are inwardly directed tray supporting elements 73, the spacing of the elements along the chain being equal to the increment of advance of the sprocket chains upon actuation of the air cylinder 68. The tray supporting elements 73 are arranged on the sprocket chains 54 and 63 so as to lie in vertically spaced horizontal planes so that a tray carried by the elements 73 is likewise horizontal. The increments of advance of the chains 54 and 63, as well as the distance between successive elements 73, are such as to permit the location of a loaded tray between successive sets of elements 73 without interference therewith and preferably with a minimum of clearance, thereby resulting in a maximum capacity of the proofing chamber.

In order to facilitate and permit the transfer and shifting of the loaded trays on to the conveyor, between successive vertical flights of the conveyor, and from the conveyors, there is provided a pair of laterally spaced horizontal tracks 76 along the plane of the lower edge of the feed and discharge openings 51, 52 and located in alignment with the vertical paths of the tray supporting elements 73. The tracks 76 are interrupted along their length to allow passage of the conveyor belts 54, 63 and the elements 73.

Disposed below the upper termini of the conveyors, there is also provided a pair of track members which are periodically movable into and out of operative position. Each of the track members includes an angle member 77 having a horizontal leg 78, a vertical leg and a rearwardly projecting arm 79 rotatably supported by a pin 80 adjacent the vertical leg of the angle member 77 carried by brackets on the longitudinal walls. The free end of the arm 79 is connected by a suitable link to the piston rod 81 of a vertically acting air actuated cylinder 82. The angle members 77 extend for substantially the full length of the chamber and are interrupted along their length to permit the passage of the sprocket chains 54, 63 and the support elements 73. The horizontal arm or track 78 of the angle members 77 is movable as aforesaid between a position coplanar with the upper surface of a set of tray supporting elements 73 and a position outside the path of the tray supporting elements 73, as illustrated by solid and broken lines respectively (Fig. 3). The air cylinder 82 is actuated to withdraw the track 78 to its retracted position only during the advance period of the sprocket chains 54, 63 and to return the track horizontal arm 78 to a tray supporting position during the rest period of the conveyors.

The mechanism for carrying a tray through the feed opening 51 and depositing it upon a corresponding set of tray supporting elements 73 includes a pair of centrally located longitudinally spaced sprocket wheels 83 carrying a longitudinally extending sprocket chain 84. The chain 84 is located between the pairs of sprocket chains 54 and directly below the lower edge of the feed opening 51 and the aligned set of tray supporting elements 73 when the conveyor is in rest position.

A dog 86 is carried by the sprocket chain 84, which is located below a tray supporting feed platform, extending outwardly from the feed opening 51. The dog 86 projects vertically through a slot in the platform and is reciprocated between a position at the trailing end of the tray supporting platform and a position immediately rearwardly of the vertical flight 58 of the sprocket chain 54. The reciprocating motion of the dog 86 is produced in any well known manner by means of a suitable drive mechanism which is synchronized to act during the rest period and immediately prior to the advance of the sprocket chains 54 and 63.

A second tray shifting mechanism includes a sprocket chain 87 in longitudinal alignment with the sprocket chain 84 and extending between the vertical runs of the sprocket chains 63 and the vertical runs 58 of the sprocket chains of the next conveyor section 53.

The sprocket chain 87 is carried by a pair of longitudinally spaced sprocket wheels 88 and carries along its upper run a tray by an upwardly directed dog 89, the sprocket wheels 88 being actuated in synchronism with the sprocket wheels 83 reciprocating the dog 89 between a retracted position rearwardly of the trailing edges of the trays carried by the downward run of the first conveyor section 53 and a point slightly rearward of the tray supporting elements 73 of the second conveyor section 53.

The third lower tray shifting mechanism 91 is similar in construction and operation to the first and second tray feeding mechanisms and carries the trays from the lower terminus of the downward flight of the conveyor section 53 through the discharge opening 52 in the cabinet 50 on to a discharge slide.

A tray shifting mechanism 93, similar to those above described, is provided along the upper termini of the conveyor sections. The operation, drive and synchronization of the upper tray shifting mechanism is identical to the lower tray shifting mechanism and differs only in that the dogs depend from the lower run of the dog-supporting sprocket chains and the trays are shifted between the upper and downward runs of the succeeding flights of each of the conveyor sections 53.

Following the proofing chamber 21 is the unloading mechanism 23 for separating the proofing cloths 42 from the trays 34 and the raised pieces of dough from the proofing cloths. The mechanism, illustrated in Figures 5 to 7 of the drawings, is supported upon a suitable framework and includes a pair of laterally spaced, longitudinal track members 96 extending from a point forward of the discharge opening 52 of the proofing cabinet 50, the distance between the outer edges of the tracks 96 being slightly less than the width of the trays 34. Each of the tracks 96 is provided with an outer, upwardly directed flange 97 secured to the inner ends of a pair of longitudinally spaced, centrally pivoted levers 98, the outer ends of which levers are coupled by links 99 to the piston rods of air actuated cylinders 100. The piston rods of the cylinders 100 are normally in a positon whereby the tracks 96 are horizontally disposed and capable of slidably supporting a tray 34. The actuation of the air cylinders 100 is synchronized with the cloth removing device, as will be hereinafter set forth, so as to raise their piston rods following the removal of the cloth to thereby rotate the tracks 96 out of vertical alignment with the side edges of the supported tray 34, permitting the tray to fall below the tracks 96 on to a truck 101 disposed below the tracks 96 and carrying previously stacked trays.

Located below the tracks 96 and laterally spaced from the side edges thereof are a pair of parallel sprocket chains 102 which are engaged and supported by idler sprockets 103. Each of the chains 102 carries a dog 104 which normally projects upwardly from the chain 102 and is provided with an inwardly directed arm located at the level of the tray supported by the tracks 96. The trailing end of each of the sprocket chains 102 passing about the sprocket wheel 103 is loaded with a suitable weight, and the leading end of each of the chains 102 is engaged by way of a crossbar by the piston rod 106 of a small bore air cylinder 107 to effect the yieldable advance of a tray supported by the tracks 96. When the piston rod 106 is in its advanced position, the dog 104 is swung about the sprocket 103 below the level of the tracks 96, and upon full retraction of the piston rod 106 into the cylinder 107, the dog is advanced to a position less than the length of the tray from the cloth removal section of the unloading mechanism. The actuation of the piston rod 106 is periodic and is controlled in any well known manner to synchronize with the cloth removal mechanism which, in turn, is synchronized with the conveyor system 22 and the proofing chamber 21.

The cloth separating mechanism includes an upwardly, forwardly inclined ramp 108 extending from a point forward of the leading end of the tracks 96. A pair of parallel, longitudinally extending endless sprocket chains 109 positioned below the ramp 108 are laterally spaced a distance equal to the spacing between the recesses 37 formed in the trays 34. The chains are supported and continuously driven by a plurality of sprocket wheels 110, and carry along their length outwardly directed, forwardly facing hook members 111 which define elements for engaging the exposed portions of the bars 49 carried by the proofing cloths 42. The ramp 108 has a pair of longitudinal slots 112 formed therein through which the hook elements 111 project as they are carried by the chains 109 along their forward flights in the direction of the ramp 108.

Disposed below the ramp 108 is a horizontal, reciprocating, flat spatula member 113 having a pair of parallel slots 114 formed therein which extend from the leading edge of the spatula and are laterally spaced a distance equal to the spacing between the tray recesses 37 to define fingers 116. Mounted at the leading edge of each of the fingers 116 is a flap 117 which has a limited swing between the level of the leading edge of a tray 34 carried upon the tracks 96 and a point immediately above the leading edge of such supported tray. The swing of the flaps 117 is limited as aforesaid in any well known manner such as by employing a conventional hinge connection between the flaps and the fingers of the limited swing type.

Secured to the underface of the spatula member 113 is a transversely extending, downwardly directed channel member 118. An upwardly extending follower 119 slidably engages the channel member 118 and is mounted on the upper face of a longitudinally extending sprocket chain 120 carried and continuously driven by a pair of horizontal sprocket wheels 121. Thus, the spatula member 113 is continuously reciprocated by the chain-carried follower 119 in synchronism with the various other drives on the device.

Disposed below the flap members 117, when the spatula 113 is in its retracted position, is a cam member 122 mounted on an intermittently synchronously driven shaft 123, the cam member being actuated to raise the flaps 117 immediately preceding the forward stroke of the spatula member 113. A tray return finger 126 is located on the under-face of the middle spatula finger 116. Forward of the leading edge of the ramp 108 is a transversely extending roller 127 which is mounted on a shaft 128 which carries a pair of the sprockets 110. A positively driven, laterally extending roller 129 is disposed forward of the roller 127 and substantially bridges the space between the roller 127 and a discharge chute 130 leading to the fryer unit 24. Disposed below the return run of the sprocket chain 109 is a pair of periodically actuated cams 132 which rotate into engagement with the proofing cloth bar 47 when in registry with the cam 132 to carry the bar and proofing cloth forward of the elements 111, thereby releasing the cloth and permitting it to fall upon an underlying cloth truck 133.

In operation, a cloth carrying loaded tray is discharged from the proofer cabinet on to the tracks 96, the rear edge of the tray 34 thereafter being engaged by the yieldingly advancing dog 104 which pushes the tray until its leading edge engages the abutting edge of the spatula flaps 117. The spatula and the tray are thence retracted in unison as controlled by the sprocket chain 120 and the follower 119 which engages the channel member 118 until the spatula member 113 has been fully retracted. Thereafter, a pair of hook elements 111, transported by the sprocket chains 109, are advanced into engagement with the exposed portions of the proofing cloth bar 49. The cam 122 is concurrently actuated to raise the flaps 117, and the spatula member thence advances toward the tray, the flaps 117 and the fingers 116 projecting between the proofing cloth 42 and the tray 34. The proofing cloth 42 and the pieces of dough carried thereon are withdrawn by the advancing engaging elements 111 and carried up the ramp 108. As the bar 49 is being disengaged from the recesses 41, the spatula 113 continues its advance, the depending finger 126 engaging the leading edge of the tray 34 and pushing the tray 34 backwardly upon the tracks 96.

After the loaded proofing cloth 42 has been completely withdrawn from supporting contact with the tray 34, the air cylinders 100 are momentarily actuated to tilt the tracks 96 and discharge the unloaded tray on to the waiting truck 101. The tracks 96 are now in a position for the reception of the next tray discharged from the proofing cabinet. The loaded proofing cloth is pulled upwardly along the ramp 108 and sharply around the rollers 127, the pieces of dough there being separated from the proofing cloth 42 and carried by the roller 129 on to the fryer delivery chute 130. The cloth is further carried by the engaging elements 111 until it is released therefrom by the cams 132 and falls upon the truck 133. It should be noted that the various drives are synchronized to achieve the above sequence of events, as well as being synchronized with the conveyor 22 in the proofer 21.

The dough pieces are discharged along the chute into successive compartments of the continuous fryer 24, the compartments being separated by the advancing, transversely extending paddles 134. The fryer includes a longitudinally extending trough 135 which carries temperature controlled hot liquid shortening. The pieces of dough are at least partially submerged in the hot shortening, and as they reach the mid-point of the fryer, they are reversed by a flipping mechanism 137 and continue their passage along the remainder of the fryer. The cooked cakes are discharged from the fryer by means of a continuous conveying system 137 which deposits the cooked cakes on a connecting endless conveyor 138. The fryer is preferably of the form described in the previously identified U.S. Patent No. 2,709,955. From the connecting conveyor, the cooked cakes are deposited on a horizontal, endless conveyor 139 which carries the cakes into registry with the glazing unit 140, which may be of any conventional form such as for example as that of the general type described in U.S. Patent No. 2,451,940, granted October 19, 1948 to M. G. Genduca.

The apparatus for loading the cooked cakes upon trays is illustrated in detail in Figures 8 through 12 of the drawings and includes principally a mechanism for depositing trays from a stack upon an endless conveyor in a spaced end-to-end fashion and in depositing the cooked cakes upon the tray with means for preventing the placing of cakes between successive trays.

Following the horizontal conveyor 139, which carries the cooked cakes under the glazing device, is a downwardly inclined endless conveyor 140 having its feed end closely spaced to the end of the conveyor 139 and its lower discharge end shortly above an upwardly forwardly inclined tray advancing conveyor 141. The discharge end of the conveyor 140 is considerably rearward of the discharge end of the tray carrying conveyor 141.

A stack of trays 142 is disposed below the glazing conveyor 139 and above the tray advancing conveyor 141 immediately forward of the feed end of the latter. The trailing edge of the lowermost tray is supported upon a narrow transverse suitably supported shelf 143, having a forwardly inclined apron 144 depending from its front edge. The leading corners of the lowermost tray of the stack 142 rest upon a pair of laterally spaced metering devices 146, which are rotatably mounted on vertical shafts 147. The metering device 146 includes a laterally extending platform member 148 and a helical ramp 149 having a tapered leading edge 150, the ramp 149 being inclined upwardly clockwise, as viewed in Figure 12 of the drawing, and having a pitch so that the upper leading edge is one tray thickness above the platform 148.

Thus, when the metering member 146 is rotated 90° clockwise, the corners of the lowermost tray are released and permitted to fall downwardly and the ramp 149 engages the underface of the next succeeding tray. Upon the metering member 146 being returned to its original position, as shown in full line in Figure 12 of the drawing, the ramp releases the lowermost tray and permits it to fall upon the platform 148 ready for dropping on the next cycle.

A crank member 151 is affixed to each of the metering devices 146 and is coupled to the piston rod 142 of an air motivated cylinder 153. The cylinder 153 is periodically actuated in synchronism with the advance of the conveyor 141 to drop successive trays upon the conveyor 141 in closely spaced end-to-end relationship.

In order to release the trailing edge of the lowermost tray from the shelf 143, there is provided a pushing element 154 which is at the level of the lowermost tray and of slightly less than the thickness thereof. The element 154 is pivoted at one end thereof and is provided with a lug 156 which is coupled to the piston rod of an air actuated cylinder 157. Thus, upon advance of the cylinder 157 piston rod, the pusher element 154 is rotated about its pivot point to the position shown in broken line in Figure 12 of the drawing to eject the lowermost tray from the shelf 143 and permitting it to fall along the apron 144 upon the conveyor 141. The cylinder 157 is periodically actuated to operate immediately following the release of the forward two corners of the lowermost tray by the metering device 146.

The trays, designated by the letter T, are carried by the conveyor 141 past a point beneath the discharge end of the conveyor 140. A pair of rotating rollers 160 and 161 of successively smaller diameter are located forward of the discharge end of the conveyor 140 and provide means for smoothly delivering fried cakes from the conveyor 140 to the trays T carried by the conveyor 141. It should be noted that the conveyor 141 is provided with regularly spaced, upwardly directed dogs 163 which engage the trailing edges of successive trays T. The side edges of the trays T, at least in the vicinity of the discharge end of the conveyor 140, ride upon suitably supported, laterally spaced tracks 164 having parallel, upper strips 165 separated from the track 164, a distance slightly greater than the height of the tray T.

In order to prevent the deposition of cakes upon the space separating successive trays T as they are transported below the cake-feed point defined by the roller 161, there is provided a bridge mechanism including a transversely extending, longitudinally reciprocable slide plate 166 slidable along the upper face of the strips 165 and extending across the conveyor 141 and spaced a short distance above the upper face of the conveyed trays T. The slide plate 166 is provided at its sides with depending brackets 167 which are pivoted by means of pins 168 to one end of a bell crank 169. The knee of the bell crank 169 is rotatably engaged by a pivot 170 and the free end of the bell crank 169 carries a cam follower 171. The cam follower 171 engages a suitably shaped cam 172 rotated in synchronism with the conveyor 141 and effecting the movement of the bell crank 169 and the slide plate 176 in the manner hereinafter set forth.

As the trailing edge of a leading tray T approaches the roller 161, the slide plate 166 is advanced, by means of the bell crank 169 and the cam 172, rapidly forward so as the trailing edge of a tray T approaches the leading end of the roller 161, the leading edge of the slide plate 166 overcomes the trailing edge of the tray T. Moving more rapidly than the trays T the slide plate 166 extends to a point where it substantially overlaps the leading tray T, as illustrated in Figure 10 of the drawing. Thus, any cakes which are discharged from the conveyor 140 concurrently with the arrival of a tray-intervening space below the cake discharge point such cake will fall upon the slide plate 166. The slide plate is then retracted and any cake which may have fallen thereon is caused to slide along the plate 166, upon retraction of the plate, by abutting the roller 161. The slide plate 166 is preferably not retracted until the leading edge of the next successive tray reaches a point sufficiently forward of the leading edge of the slide plate 166 so that upon the rapid retraction of the slide plate any cake carried by the slide plate will of necessity fall on the following tray T. The cam 172 is shaped so as to achieve the above sequence of events.

Disposed forwardly of the discharge end of the tray conveyor 141 is a tiltable platform 180 having an upper face co-planar with the upper surface of the conveyor 141 and forming an extension thereof whereby trays T carried by the conveyor 141 may be pushed by the dogs 163 onto said platform 170. The trailing end of the platform 180 is provided with a depending leg 181 pivoted at its lower end to a bracket 182 to permit the movement of the platform 180 to a horizontal position in alignment with the feed opening 183 formed in the cooler 29. The platform 180 is normally in alignment with the conveyor 141, as illustrated in full line in Figure 8 of the drawing, and carries a normally open switch 174 at its forward end, said switch being actuated by a resilient arm 176 having a sensing element 177 disposed above the level of the platform 180. An air-actuated cylinder 178 has its piston rod connected to a lug 179 projecting rearwardly from the arm 181 depending from the platform 180. The piston rod of the cylinder 178 is normally in a retracted position and upon closing of the switch 174, by reason of a tray passing onto the platform and contacting the sensing element 177, the cylinder 178 is actuated to advance the piston rod and carry the platform 180 to the position shown in broken line in Figure 8 of the drawing in alignment with the feed opening 183 of the cooler 29. A suitable electrical network is provided to effect the retraction of the platform 180 to its normally inclined position following the discharge of the tray carried thereby into the cooler 29.

The cooler 29 includes a cabinet 190 in which is located a pair of conveyor sections 191 similar in construction to the conveyor sections 53 of the proofer 21 and provided with the track-actuating mechanism and tray-shifting systems similar to that associated with the conveyor sections 53. It should here be noted that whereas the conveyor sections 53, as well as the conveyor sections 191 have been illustrated and described as being longitudinally spaced a distance greater than the spacing between the individual vertical flights in each of the conveyor sections, the spacing between the successive sections may be equal to the spacing between the individual successive flights. In the latter case, the tray-shifting mechanism may be greatly simplified in that a common tray-shifting motivating device may be used for all the lower transfer points and for all the upper transfer points. The motivation of the conveying and tray-transfer system within the cooler 29 is similar to that in the proofer 21 except that it is actuated in synchronism with and immediately following the depression of the platform 180 to a horizontal position in alignment with the feed opening 183. The transfer mechanism and conveyor are actuated to perform a single cycle of feeding the tray onto the conveyor, transferring the trays between successive vertical flights, discharging a tray and thereafter advancing the conveyor a unit increment. Immediately after the discharge of a tray from the platform 180 it returns to its inclined position in alignment with conveyor 141 to receive the next tray T. The cooler transfer and advancing cycle is not repeated until another tray T is loaded upon the platform 180. It should be noted that successive, vertical flights of the cooler conveyor are separated by vertical panels 192 and that means are provided for circulating controlled, warm air through the first compartment defined by the front wall of the cabinet 190 and the first adjacent panel 192 and cool, moist air through the successive compartments in the cooler 29.

A normally horizontal platform 194 is in longitudinal alignment with the discharge opening 196 of the conveyor cabinet 190 and extends for a distance substantially equal to the length of the tray T. The forward edge of the platform 194 is hinged as at 196 to permit the swinging of the trailing edge of the platform 194 from alignment with the cooler discharge opening 196 to a point vertically and forwardly disposed therefrom. A platform-actuating cylinder 197 is pivoted to a base 198 below the platform T and is provided with an upwardly directed piston rod 199 whose free end is pinned to a lug 200 depending from the platform 194 shortly rearward of its leading edge. Forward of the leading edge of the platform 194 is a stationary, forwardly, downwardly inclined slide plate 201 which is in alignment with the platform 194 when the latter is in its raised position as shown in broken line in Figure 13 of the drawing and as effected upon actuation of the cylinder 197. A pair of positively driven, laterally extending rollers 202 are positioned forward and below the bottom edge of the plate 201, the bite between the rollers 202 being coplanar with the upper surface of the slide plate 201 and in alignment therewith. A laterally extending arcuate transfer plate 203 defines a bridge from a point slightly forward of the trailing edge of the plate 201 and the feed end of an upwardly inclined, endless conveyor 204. A stacking truck 206 is located below the rollers 202 for receiving the successive unloaded trays T. The air cylinders 68, 100, 178 and 197 and the associated timing and control mechanisms may be of any well known and conventional type, for example the air cylinders may be provided with conventional solenoid actuated valves, the solenoids in turn being controlled by conventional electrical timing mechanisms and networks to effect the stated functions.

In operation, a tray T is advanced by a dog 207 carried by the cooler lower tray transfer mechanism onto the waiting horizontal platform 194. Thereafter, the platform is swung to its inclined position by actuation of the cylinder 197, the loaded tray carried by the platform sliding downwardly along the plate 201 and into the bite between the rollers 202. The rollers 202 withdraw the tray at a predetermined rate discharging it upon the truck 206. The cakes carried by the tray T slide upon the tray T or with the tray T and over the bridge plate 203 onto the conveyor 204, which carries the cakes to a subsequent processing point. A suitable mechanism is provided for synchronizing the operation of the tray 194 with the cooler conveying mechanism so that the tray is urged to its inclined position immediately following the complete discharge of a tray from the cooler 29 onto the platform 194. Furthermore, the retraction of the platform 194 from its inclined to its horizontal position is delayed sufficiently by a suitable timing mechanism to permit the removal and unloading of a tray carried by the platform 194.

The conveyor 204 discharges the cakes onto a chute 208 which leads to the feed end of the sugaring device 32. The sugaring device 32 includes a hollow, open-ended, imperforate drum 209 inclined forwardly and downwardly and having a removable helical member 210 located along the inner face of the drum 209 and being of substantially circular cross section. The drum 209 is rotatably supported and provided on its outer face with a friction annulus 211 which is engaged by a friction wheel 212 suitably driven by a variable speed motor 213 so as to rotate the drum 209 in a direction opposite to the pitch of the helical member 210. A sugar-circulating system is provided having an inlet 216 adjacent the discharge end of the drum 209, the opening 216 being covered by a perforated plate or screen 217 to permit the passage of the sugared cakes over the plate and the dropping of the sugar into the feed opening 216. The sugar discharged into the feed opening 216 is conveyed by any suitable means 218, preferably through a sieve to an elevator 219 which carries metered quantities of the sugar and discharges it into the feed end of the drum 209. A pair of removable, stationary plates are provided at each end of the drum 209 and have formed therein a feed opening and a discharge opening permitting the depositing and discharge of the cakes being treated by the sugaring device 32. The sugared cakes slide along the plate 217 onto a continuous conveyor 220 where they are transported for packaging or further processing.

In the embodiment described and illustrated the cutter 20, conditioner or proofer 21, tray unloader 23, fryer or cooker 24 and the associated conveyors are tied together and synchronized so that their operational rates are dependent upon each other, a change in one of the operational rates being accompanied by a corresponding change in the others. Likewise tied together as a synchronized operational unit are the stacker 28, the cooler 29, the unloader 30 and the associated conveyors, this unit operating at a sufficient rate to accommodate the discharge from the fryer 24.

Considering now the operation of the improved apparatus as applied to the production of yeast-raised, sugar-coated doughnuts, successive trays 34 engaging superimposed proofing cloths 42 are loaded in the cutter 20 with regularly spaced pieces of shaped yeast-containing dough. The trays are then either manually fed to the proofer loading platform during the interval between successive periodic tray transfer operations or the trays may be delivered by a synchronized conveyor from the cutter 20 to the proofer 21. The dough-loaded trays are temporarily stored and transported through the proofer 21 by the conveyor 22 as aforesaid while air of predetermined humidity and temperature is circulated through the proofer to effect the desired raising of the pieces of dough. It is important to note that in accordance with the preferred form of the present improved process and unlike the conventional methods heretofore practiced, the humidity within the proofer 21 is maintained at a predetermined point below saturation in order to effect the formation of a skin of predetermined characteristics on the pieces of dough. The above ambient conditions may be achieved in any manner well known in the air conditioning art, such as by controlling the introduction of fresh air into the proofer in order to lower the humidity therein.

The trays carrying the raised pieces of dough are transported through the unloading device 23 where the dough-carrying proofing cloths are separated from the trays, the trays being stacked upon the truck 101 and the pieces of dough are thereafter separated from the proofing cloths, the cloths being stacked on the truck 133. The pieces of dough are deposited into successive, advancing compartments in the fryer unit 24. The loaded trucks 101 and 133 are moved from below their respective positions and replaced by empty trucks, the cloths and trays being thereafter reassembled and reemployed as aforesaid. The fried cakes are discharged from the fryer 24 upon a connecting conveyor 138 which temporarily stores the fried cakes for at least 50 seconds to effect the slight cooling of the fried cakes prior to subsequent tretament thereof. The fried cakes are then loaded by the loading device 28 upon successive trays T which are transported to the loading and triggering platform 180 and from there fed into the cooler 29 through which it is temporarily stored and transported. In the first vertical flight of the trays through the cooler the fried cakes are submitted to circulating air which is heated to a predetermined, controlled temperature in order to extract moisture from the fried cakes to bring them to a predetermined moisture content. This step is novel and highly advantageous in the present process, resulting in a more uniform and highly improved product. During the subsequent storage and transportation of the fried cakes through the cooler 29 they are subjected to cool moisture-carrying air of predetermined humidity and temperature in order to cool the fried cakes and to maintain the predetermined moisture content therein. The various temperatures and humidities within the cooler 29 are controlled so that the fried cakes discharged from the cooler are not below room temperature and do not exceed room temperature by more than two or three degrees. The fried cakes are then removed from the trays T by the unloading device 30 and conveyed to the sugaring device 32. There the fried cakes are tumbled in the barrel 209 with powdered sugar or other powdered material and advanced through the barrel 209 to the discharge end thereof where they are delivered onto a conveyor 280 in a condition for packaging.

In the event that glazed doughnuts are desired the fried cakes as they are transported by the conveyor 139 are subjected to a curtain of glaze from the glazing device 140 in any conventional manner to partially or completely enrobe the fried cakes which are then deposited on successive trays T and carried through the cooler. The trays of the cooled, glazed cakes are delivered directly to a packing table, the unloading device 30 and the sugaring device 32 being obviated. Furthermore, in the event that a yeast dough is not employed and conditioning and proofing therefor unnecessary, the proofer 21 and the unloading device 23 are not employed, the cut pieces of dough being delivered directly to the fryer 24 and thereafter treated in the manner above described.

While there have been described and illustrated preferred embodiments of the present invention, it is apparent that numerous alterations and omissions may be made without departing from the spirit thereof.

I claim:

1. The improved method of producing yeast-raised baked products, comprising depositing a plurality of cut pieces of yeast-containing dough upon a first tray, feeding said loaded tray into a proofing zone, intermittently transporting said tray through said proofing zone, maintaining the temperature and humidity of said proofing zone within predetermined limits whereby to effect the controlled raising of said pieces of dough, separating said pieces of dough from said tray, transporting said pieces of dough continuously through a cooking zone, depositing said cooked pieces of dough upon a second tray, introducing said second tray carrying said cooked pieces of dough into a cooling zone, and intermittently transporting said second tray of cooked pieces of dough through said cooling zone maintained at predetermined temperature and humidity conditions, and wherein said pieces of unraised dough are placed upon a perforated cloth which, in turn, is carried upon said first tray through said proofing zone, said cloth being separated from said first tray after leaving said proofing zone and said pieces of dough being thereafter separated from said cloth.

2. An improved apparatus for the production of baked products, comprising a plurality of trays, each of said trays being capable of carrying a plurality of pieces of dough, a proofing cabinet, means for separably supporting and intermittently transporting said trays through said proofing cabinet, means for discharging said trays from said proofing cabinet, means for separating said pieces of dough from said trays following discharge from said proofing cabinet, a cooking unit, means for depositing said separated pieces of dough into said cooking unit, means for continuously conveying said pieces of dough through said cooking unit to produce cooked cakes, means for discharging said cooked cakes from said cooking unit, a plurality of second trays, means for depositing said cooked cakes upon said second trays, a cooling cabinet, means for individually feeding said second trays into said cooling cabinet and means for transporting said trays loaded with said cooked cakes through said cooling cabinet.

3. The improved apparatus in accordance with claim 2, including perforated cloths superimposed upon said first trays, said pieces of dough being carried upon said perforated cloths, and said means for separating said pieces of dough from said trays operating to separate the dough pieces from said perforated cloths following discharge from said proofing chamber.

4. The improved apparatus in accordance with claim 3, including means for separating said pieces of cloth from said first trays following discharge from said proofing chamber and prior to separation of said pieces of dough from said cloths.

5. The improved apparatus in accordance with claim 3, wherein said proofing cloths are removably secured to said trays along their corresponding leading edges.

6. The improved apparatus in accordance with claim 2, including means for preventing the deposition of the cooked cakes between successive second trays.

7. The improved apparatus in accordance with claim 2, including means for removing the cooked cakes from said second trays following discharge from said cooling unit.

8. The improved apparatus in accordance with claim 7, including means for applying a powdered coating to said cooked cakes following separation from said second trays.

References Cited in the file of this patent
UNITED STATES PATENTS

| | | |
|---|---|---|
| 1,115,621 | Van Houten | Nov. 3, 1914 |
| 1,427,869 | Van Houten | Sept. 5, 1922 |
| 1,672,522 | Greer et al. | June 5, 1928 |
| 1,732,228 | Greer et al. | Oct. 22, 1929 |
| 1,819,557 | Hunter | Aug. 18, 1931 |
| 1,821,689 | Broeg | Sept. 1, 1931 |
| 1,840,289 | Hunter | Jan. 5, 1932 |
| 1,893,169 | Hartmann | Jan. 3, 1933 |
| 1,908,539 | Quick | May 9, 1933 |
| 1,979,553 | Hunter | Nov. 6, 1934 |
| 2,219,410 | Bradshaw | Oct. 29, 1940 |
| 2,255,282 | Duffy et al. | Sept. 9, 1941 |
| 2,277,783 | Scharf | Mar. 31, 1942 |
| 2,334,650 | Ruch | Nov. 16, 1943 |
| 2,570,127 | Hunter | Oct. 2, 1951 |
| 2,625,284 | Atwood | Jan. 13, 1953 |
| 2,639,049 | Kinzelman et al. | May 19, 1953 |
| 2,660,134 | Bertrand | Nov. 24, 1953 |
| 2,664,188 | Rhodes | Dec. 29, 1953 |
| 2,724,351 | Kottmann | Nov. 22, 1955 |